(12) United States Patent
Yoo et al.

(10) Patent No.: US 11,966,610 B2
(45) Date of Patent: Apr. 23, 2024

(54) STORAGE DEVICE CAPABLE OF ADJUSTING SIZE OF ZONED NAMESPACE AND OPERATING METHOD THEREOF

(71) Applicant: SK hynix Inc., Gyeonggi-do (KR)

(72) Inventors: Gi Gyun Yoo, Gyeonggi-do (KR); Young Ho Ahn, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 62 days.

(21) Appl. No.: 17/730,648

(22) Filed: Apr. 27, 2022

(65) Prior Publication Data

US 2023/0134639 A1 May 4, 2023

(30) Foreign Application Priority Data

Nov. 4, 2021 (KR) ........................ 10-2021-0150388

(51) Int. Cl.
*G06F 12/00* (2006.01)
*G06F 3/06* (2006.01)

(52) U.S. Cl.
CPC .......... *G06F 3/0644* (2013.01); *G06F 3/0604* (2013.01); *G06F 3/064* (2013.01); *G06F 3/0679* (2013.01)

(58) Field of Classification Search
CPC ...... G06F 3/0644; G06F 3/0604; G06F 3/064; G06F 3/0679; G06F 3/0631; G06F 3/0688; G06F 3/0605; G06F 3/067; G06F 3/0658; G06F 12/0292; G06F 13/1663
USPC .......................................................... 711/154
See application file for complete search history.

(56) References Cited

U.S. PATENT DOCUMENTS

| | | | |
|---|---|---|---|
| 11,055,176 B1* | 7/2021 | Helmick | G06F 3/0619 |
| 2019/0042408 A1* | 2/2019 | Schmisseur | H04L 45/28 |
| 2020/0167274 A1* | 5/2020 | Bahirat | G06F 3/0644 |
| 2021/0397348 A1* | 12/2021 | Agarwal | G06F 3/061 |

FOREIGN PATENT DOCUMENTS

KR 10-2015-0116606 A 10/2015

* cited by examiner

*Primary Examiner* — Mardochee Chery
(74) *Attorney, Agent, or Firm* — IP & T GROUP LLP

(57) ABSTRACT

A storage device may include a storage comprising a plurality of dies each having a plurality of memory blocks, and configured to provide a default ZNS (Zoned NameSpace) size to a host device; and a controller configured to generate a ZNS by selecting one or more memory blocks corresponding to a required ZNS size from the plurality of dies to allocate the selected memory blocks to the ZNS in response to a ZNS generation request signal which includes the required ZNS size and is provided from the host device.

20 Claims, 12 Drawing Sheets

STORAGE DEVICE CAPABLE OF ADJUSTING SIZE OF ZONED NAMESPACE AND OPERATING METHOD THEREOF

CROSS-REFERENCES TO RELATED APPLICATION

The present application claims priority under 35 U.S.C. § 119(a) to Korean application number 10-2021-0150388, filed on Nov. 4, 2021, which is incorporated herein by reference in its entirety.

BACKGROUND

1. Technical Field

Various embodiments of the present disclosure generally relate to a semiconductor integrated device, and more particularly, to a storage device and an operating method thereof.

2. Related Art

A storage device is coupled to a host device, and performs a data input/output operation according to a request from the host device.

With the development of AI (Artificial Intelligence) and big data-related industry, research is being actively performed on a high-performance data center or personal computing device. The high-performance computing device may be implemented to drive a plurality of operating systems and/or application programs by using a hardware pool representing a storage device.

There is a need for a method capable of providing high performance without interference among the plurality of application programs in a multi-tenant computing device.

SUMMARY

In an embodiment of the present disclosure, a storage device may include: a storage comprising a plurality of dies each having a plurality of memory blocks, and configured to provide a default ZNS (Zoned NameSpace) size to a host device; and a controller configured to generate a ZNS by selecting one or more memory blocks corresponding to a required ZNS size from the plurality of dies to allocate the selected memory blocks to the ZNS in response to a ZNS generation request signal which includes the required ZNS size and is provided from the host device.

In an embodiment of the present disclosure, a storage device may include: a storage comprising a plurality of memory blocks; and a controller configured to: gather a plurality of memory blocks to generate a Zoned NameSpace (ZNS) having a size requested by a host device, and adjust the size of the generated ZNS on the basis of a size of write data provided by the host device.

In an embodiment of the present disclosure, an operating method of a storage device may include: transmitting, by a controller, a default Zoned NameSpace (ZNS) size to a host device, the controller serving to control a storage including a plurality of dies each having a plurality of memory blocks; receiving, by the controller, a ZNS generation request signal including a required ZNS size from the host device; and generating, by the controller, a ZNS by selecting one or more memory blocks corresponding to the required ZNS size from the plurality of dies and allocating the selected memory blocks to the ZNS.

In an embodiment of the present disclosure, an operating method of a controller may include: allocating one or more empty storage mediums to a zoned namespace (ZNS), which is configured in units of storage mediums; and controlling a memory device to perform an operation on the ZNS, wherein: the empty storage mediums are allocated according to one of a die interleaving scheme and a channel interleaving scheme, and the operation includes an erase operation to be performed in the units of storage mediums.

DETAILED DESCRIPTION

Hereafter, embodiments of the present disclosure will be described in more detail with reference to the accompanying drawings.

Figure 1:
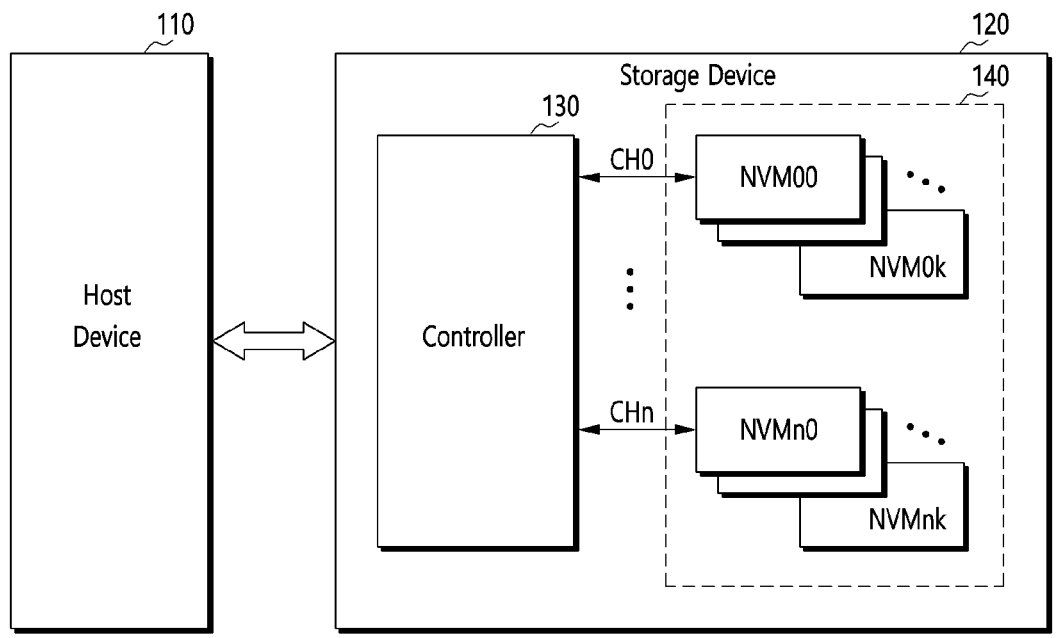
FIG. 1 is a configuration diagram illustrating a data processing system in accordance with an embodiment of the present disclosure.

FIG. 1 is a configuration diagram illustrating a data processing system in accordance with an embodiment of the present disclosure.

Referring to FIG. 1, a data processing system 100 may include a host device 110 and a storage device 120.

Examples of the host device 110 include portable electronic devices such as a mobile phone and MP3 player, personal electronic devices such as a laptop computer, desktop computer, game machine, TV and beam projector, or electronic devices such as a workstation or server for processing big data. The host device 110 may serve as a master device for the storage device 120.

The storage device 120 is configured to operate in response to a request from the host device 110. The storage device 120 is configured to store data accessed by the host device 110. That is, the storage device 120 may be used as at least one of a main memory device or auxiliary memory device of the host device 110. The storage device 120 may include a controller 130 and a storage 140.

The controller 130 may serve as a master device for the storage 140. The controller 130 and the storage 140 may be integrated in the form of a memory card or SSD (Solid State Drive) which is coupled to the host device 110 through various interfaces.

The controller 130 is configured to control the storage 140 in response to a request from the host device 110. For example, the controller 130 is configured to provide the host device 110 with data read from the storage 140 or store data provided from the host device 110 in the storage 140. For such an operation, the controller 130 is configured to control read, program (or write), and erase operations of the storage 140.

The storage 140 may be coupled to the controller 130 through one or more channels CH0 to CHn, and include one or more nonvolatile memory devices NVM00 to NVM0$k$ and NVMn0 to NVMnk. In an embodiment, the nonvolatile memory devices NVM00 to NVM0$k$ and NVMn0 to NVMnk may be each configured as one or more of various types of nonvolatile memory devices such as a NAND flash memory device, NOR flash memory device, FRAM (Ferroelectric Random Access Memory) using a ferroelectric capacitor, MRAM (Magnetic Random Access Memory) using a TMR (Tunneling Magneto-Resistive) layer, PRAM (Phase Change Random Access Memory) using chalcogenide alloys, and ReRAM (Resistive Random Access Memory) using transition metal oxide.

The nonvolatile memory devices NVM00 to NVM0$k$ and NVMn0 to NVMnk may each include a plurality of dies and one or more planes included in each of the dies. Each of the planes may include a plurality of memory blocks, and each of the memory blocks may be a group of pages or sectors. Hereafter, the memory block will be referred to as a 'block'.

Memory cells constituting each page may each operate as an SLC (Single Level Cell) capable of 1-bit data therein or an MLC (Multi-Level Cell) capable of 2 or more-bit data therein.

The nonvolatile memory devices NVM00 to NVM0$k$ and NVMn0 to NVMnk may each be configured to operate as an SLC memory device or MLC memory device. Alternatively, some of the nonvolatile memory devices NVM00 to NVM0$k$ and NVMn0 to NVMnk may each be configured to operate as an SLC memory device, and the others of the nonvolatile memory devices NVM00 to NVM0$k$ and NVMn0 to NVMnk may each be configured to operate as an MLC memory device.

In an embodiment, the controller 130 may divide a plurality of blocks into a plurality of groups and manage the groups as ZNSs (Zoned NameSpace), in response to a ZNS allocation request or a zone allocation request from the host device. The ZNSs may be logically and physically divided for application programs, respectively.

The ZNSs may indicate data storage areas which are logically and physically divided, and the plurality of applications may sequentially program data (files) in the respective ZNSs allocated thereto. Certain types of data reflecting the characteristics of the application programs corresponding to the respective zones may be sequentially stored in the zones, and the ZNS may be erased in units equal to or different from the zone, in different embodiments. That is, the ZNS may be erased on a ZNS basis or in units of blocks constituting the ZNS.

When the ZNSs are allocated with the same size and the size of data to be stored is larger than the ZNS, two or more ZNSs need to be allocated and collectively managed.

Suppose that any one file stored in one ZNS is to be deleted or corrected, while two or more files having the same size or different sizes are stored in the corresponding ZNS. When data are set to be erased only on a ZNS basis, temporal/spatial resources for processing files which are not to be deleted or corrected are consumed.

As the sizes of files managed by the host device 110 are diversified, overhead and spatial inefficiency may be caused to adjust the gaps between the file sizes and the ZNS size. For example, when the size of a file is larger than the ZNS size, a process of splitting the file according to the ZNS size and storing the split files and a process of merging the split files during a read operation or other operations are additionally required, thereby causing an overhead. When the size of a file is smaller than the ZNS size, a space corresponding to an area which remains after the file is stored in the ZNS is wasted. In order to prevent the waste of the space, the host device 110 needs to split the file according to the size of the remaining area. Such an additional process needs to be covered by the host device 110. Thus, it is necessary to minimize the overhead and the waste of the space by efficiently using the storage 140 which supports the ZNS.

The controller 130 in accordance with an embodiment may define a default ZNS unit (i.e., a default unit for a ZNS) as a single block or the minimum erase unit of the storage 140 and a default ZNS size (i.e., a size of the default ZNS unit) as a size of the single block or the minimum erase unit.

When the storage device 120 is initialized, the controller 130 may provide the host device 110 with the default ZNS size and the number of free blocks, which are available for a ZNS, among the blocks constituting the storage 140. The available number of free blocks may be referred to as the maximum allocation value. Free block indicates a block which is completely erased and thus can be immediately allocated to store data, and may be referred to as an empty block.

When ZNS allocation is required, the host device 110 may transmit a required size of a ZNS to be allocated, i.e., a required ZNS size, to the controller 130. When the number of free blocks within the storage 140, i.e., the maximum allocation value, is Q, it is apparent that the host device 110 can transmit the required ZNS size as a natural value equal to or less than Q.

Therefore, the controller 130 may allocate a ZNS adaptively to the ZNS size requested by the host device 110. As a result, the host device 110 may utilize a ZNS having a dynamically variable storage capacity enough to store therein a file of various sizes.

In an embodiment, the blocks included in one ZNS may be allocated to be simultaneously accessed through a die interleaving or channel interleaving method. In order to operate the storage 140 through the die interleaving method, the controller 130 may allocate a necessary number of blocks in a round-robin manner by rotating the dies from the next die to the die to which the last allocated block belongs. However, the present embodiment is not limited thereto.

In an embodiment, when the size of data corresponding to a write request from the host device 110 is larger than the size of a remaining (free) space of a ZNS in which the data is to be stored, the controller 130 may extend the ZNS by additionally allocating a block to the ZNS on the basis of the size of the remaining ZNS and the size of the data corresponding to the write request.

Due to the problem in which the lifetime of the storage 140 is increased, data stored in a block constituting the ZNS may be disturbed, or a bad block may occur. Valid data stored in such a block needs to be migrated to a normal block, and needs to be refreshed or read-reclaimed. When a bad block is required to be replaced within a ZNS, the controller 130 may perform a replacement operation on the ZNS not on a ZNS basis but on a block basis. That is, the controller 130 may replace not the whole ZNS but the bad block within the ZNS. Therefore, an overhead and the waste of the storage space may be reduced.

During the replacement operation, a target block, which is to replace the bad block, may be selected so that the ZNS can be accessed through the die interleaving or channel interleaving method.

When a new ZNS is to be generated, a block is to be added to a generated ZNS, or a block is to be replaced, a free block may be selected.

In order to distinguish between a free block and a block which has been already allocated to the ZNS or is being used, the controller 130 may manage, as a bitmap table, the states of all memory blocks which are used to store data (user data) of the host device 110. In an embodiment, the controller 130 may sort free blocks by allocating data having a first logic level (e.g., 0) to the free blocks and allocating data having a second logic level (e.g., 1) to bad blocks or blocks in use.

In a ZNS-based storage device, the size of data provided by the host device 110 may be variable. Thus, a ZNS may be easily and rapidly allocated, adaptively to the data size, and the size of a generated ZNS may be varied, which makes it possible to efficiently use the storage 140. Furthermore, data stored in a ZNS may be erased on a ZNS basis or in units of blocks constituting the ZNS. That is, when all data within the ZNS are to be erased, the data may be erased on a ZNS basis, and when some data within the ZNS are to be erased, the data may be erased in units of blocks.

Figure 2:
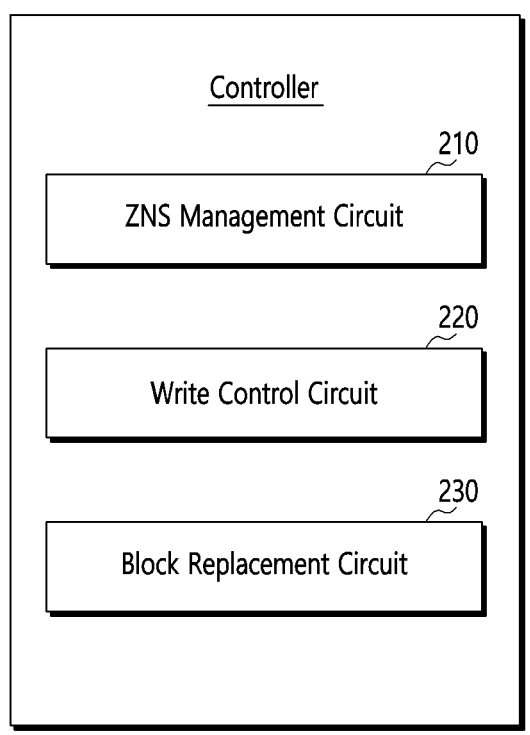
FIG. 2 is a configuration diagram illustrating a controller in accordance with an embodiment of the present disclosure.

FIG. 2 is a configuration diagram illustrating the controller in accordance with an embodiment of the present disclosure.

Referring to FIG. 2, the controller 130 in accordance with an embodiment may include a ZNS management circuit 210, a write control circuit 220 and a block replacement circuit 230.

When the data processing system 100 or the storage device 120 is activated or initialized, the ZNS management circuit 210 may generate a bitmap table indicating at least the states of memory blocks for user data by sequentially scanning the blocks constituting the storage 140. For example, the ZNS management circuit 210 may set data having the first logic level (e.g., 0) to a free block and set data having the second logic level (e.g., 1) to a bad block or a block which is being used or occupied by data, thereby distinguishing between an allocable block and an unallocable block. Furthermore, the ZNS management circuit 210 may provide the host device 110 with information of the default ZNS unit supported by the storage device 120, i.e., information of the size of a single block, and the total number of free blocks included in the storage 140. The total number of free blocks is the maximum allocation value which can be allocated to a ZNS.

The ZNS management circuit 210 may manage the states of the blocks as the bitmap table, thereby easily and rapidly sorting free blocks required for generating a ZNS. The ZNS management circuit 210 updates the bitmap table when a ZNS is generated or changed or a bad block occurs.

The host device 110 which requires a ZNS may transmit a ZNS allocation request including a start logical address to the ZNS management circuit 210 of the controller 130. In an implementation, the start logical address may be used as the identifier (ID) of the corresponding ZNS, and a separate identifier IS may be assigned to each ZNS.

When the size of a ZNS to be allocated, e.g., an required ZNS size, is included in the ZNS allocation request, the ZNS management circuit 210 may map a start physical address PBA to a start logical address LBA, access the bitmap table at a position corresponding to the start physical address, and select a plurality of free blocks corresponding to the required ZNS size, thereby constituting the ZNS. When the size of the ZNS to be allocated is not included in the ZNS allocation request, the ZNS management circuit 210 may allocate, to the ZNS, a preset number of blocks corresponding to a default value, e.g., a single block corresponding to the default ZNS unit. However, the present embodiment is not limited thereto.

In an embodiment, the ZNS management circuit 210 may generate and mange information on physical blocks constituting a ZNS as a block list for each ZNS.

After allocating the ZNS, the ZNS management circuit 210 may update the bitmap table to reflect the state information of the blocks which have been used to generate the ZNS.

When selecting the blocks to allocate the ZNS, the ZNS management circuit 210 may select the blocks constituting the ZNS, such that the blocks can be accessed in parallel through the die interleaving or channel interleaving method. For example, the ZNS management circuit 210 may select a necessary number of blocks in a round-robin manner by rotating the dies from the next die to the die to which the last allocated block belongs. However, the present embodiment is not limited thereto.

In an embodiment, when the size of data corresponding to a write request from the host device 110 is larger than the size of a remaining (free) space of a ZNS in which the data is to be stored, the ZNS management circuit 210 may additionally allocate a block to the ZNS on the basis of the size of the remaining space of the ZNS and the size of the data corresponding to the write request. Parallelism may be considered even when a block is selected to extend the ZNS, and the bitmap table and the block list for each ZNS are updated even after the ZNS is extended.

As the lifetime of the storage 140 is increased, data stored in the blocks constituting the ZNS may deteriorate, or a bad block may occur. Only when a deteriorating block or a block processed as a bad block is replaced with a normal block, data may be stably retained.

When a ZNS including a block which needs to be replaced occurs, the controller 130 may not replace the ZNS on a ZNS basis, but replace the ZNS on a block basis, thereby reducing an overhead and waste of the storage space.

A replacement target block may be selected in consideration of parallelism even when a block is replaced, and the bitmap table and the block list for each ZNS need to be updated even after a block is replaced. When block replacement was performed because a bad block occurred, the controller 130 manages bad block information as meta information, such that the bad block is excluded from block allocation during at least a ZNS-related operation.

In accordance with the present technology, it is possible to easily and rapidly allocate a ZNS, adaptively to a variable data size of the host device 110, and change the size of a generated ZNS. Furthermore, when data needs to be refreshed or read-reclaimed, the data may be migrated by the minimum unit of the ZNS, which makes it possible to efficiently use the storage 140.

The write control circuit 220 may transmit a program command to the storage 140 in response to a write request of the host device 110.

The block replacement circuit 230 may replace a deteriorating block or a block processed as a bad block within the ZNS with a normal block, in response to a request of the controller 130, or substantially the ZNS management circuit 210.

Figure 3:
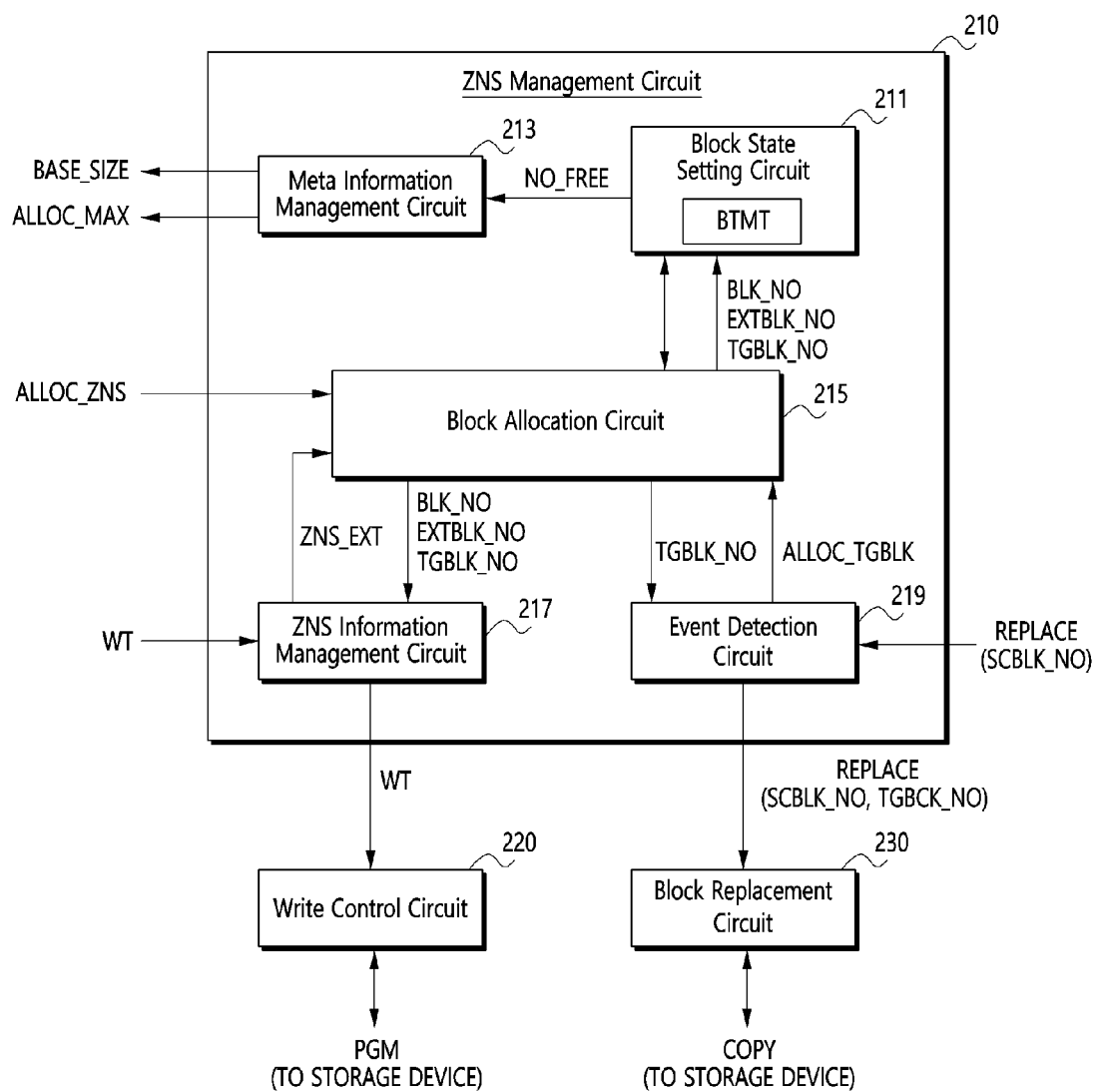
FIG. 3 is a diagram for describing a ZNS (Zoned NameSpace) management unit in accordance with an embodiment of the present disclosure.

FIG. 3 is a diagram for describing the ZNS management circuit in accordance with an embodiment of the present disclosure.

Referring to FIG. 3, the ZNS management circuit 210 may include a block state setting circuit 211, a meta information management circuit 213, a block allocation circuit 215, a ZNS information management circuit 217, and an event detection circuit 219.

When the data processing system 100 or the storage device 120 is activated or initialized, the block state setting circuit 211 may generate and store a bitmap table BTMT indicating the states of at least the memory blocks for user data within the storage 140 by sequentially scanning the blocks constituting the storage 140. An example of the configuration of the storage 140 is illustrated in FIG. 4.

Figure 4:
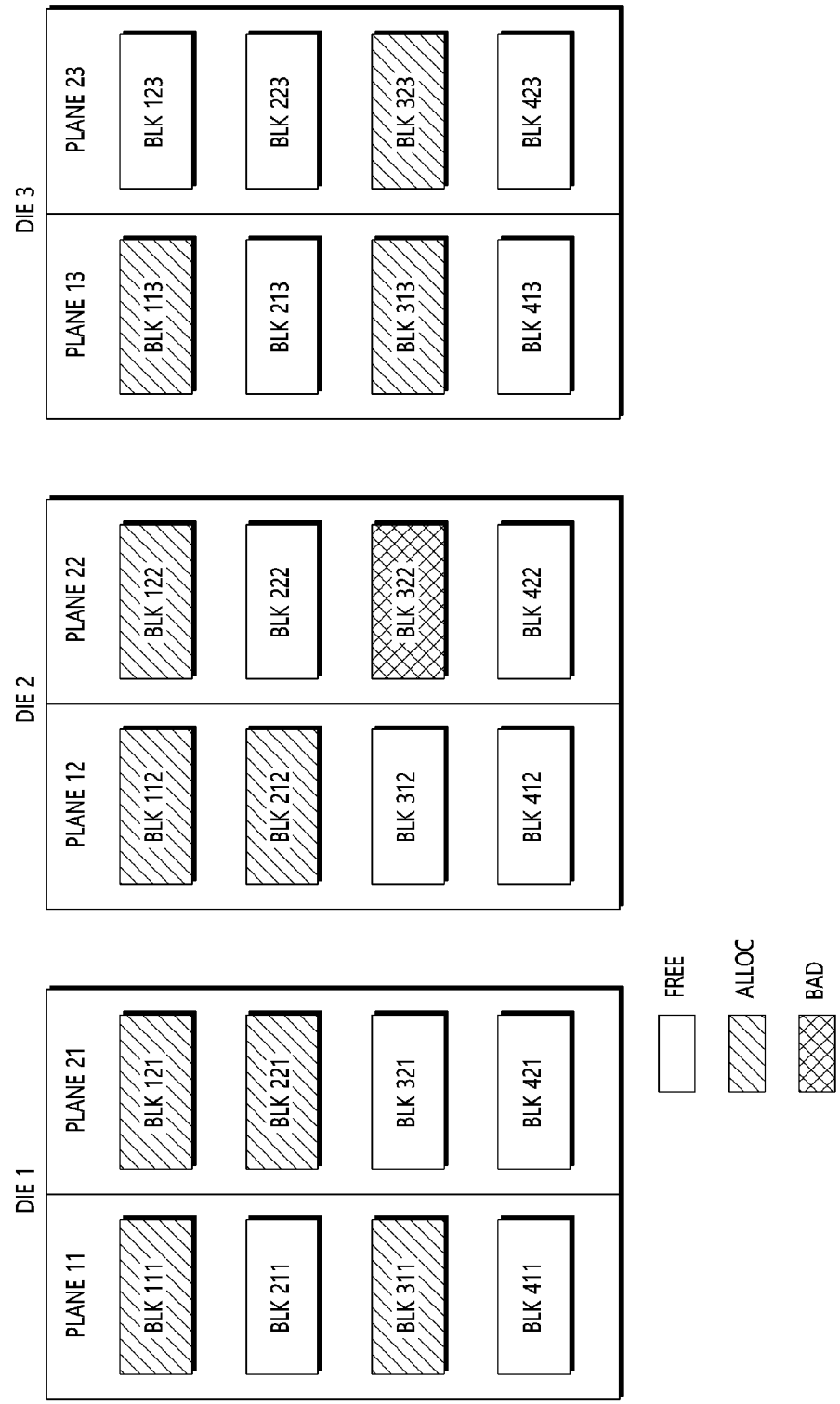
FIG. 4 is a configuration diagram illustrating a storage in accordance with an embodiment of the present disclosure.

FIG. 4 is a configuration diagram illustrating the storage in accordance with an embodiment of the present disclosure.

Referring to FIG. 4, the storage may include a plurality of dies DIE1 to DIE3. The plurality of dies DIE1 to DIE3 may include a plurality of planes PLANE11/21, PLANE12/22 and PLANE13/23, respectively.

The plurality of planes PLANE11/21, PLANE12/22 and PLANE13/23 included the respective dies DIE1 to DIE3 may input/output data through a plurality of channels CH1 to CHy and a plurality of ways WAY1 to WAYm.

The planes PLANE11/21, PLANE12/22 and PLANE13/23 may each include a plurality of blocks BLK[], and each of the blocks BLK[] may be a group of a plurality of pages.

The block state setting circuit 211 configures the bitmap table BTMT for the blocks for user data, for the storage 140 illustrated in FIG. 4.

In the bitmap table BTMT, the data having the first logic level (e.g., 0) may be set to a free block, and the data having the second logic level (e.g., 1) may be set to a bad block or a block which is being used or occupied by data, which makes it possible to distinguish between an allocable block and an unallocable block. Thus, the total number No_FREE of acquired free blocks for user data may be provided to the meta information management circuit 213.

The meta information management circuit 213 may store information of the default ZNS unit BASE_SIZE supported by the storage device 120, i.e., information of the size of a single block. The meta information management circuit 213 may receive the total number No_FREE of free blocks for user data, included in the storage 140, from the block state setting circuit 211, and store the received value as a maximum allocation value ALLOC_MAX indicating the maximum number of free blocks which can be allocated to a ZNS. When the data processing system 100 or the storage device 120 is initialized, the meta information management circuit 213 may provide information of the default ZNS unit BASE_SIZE and the maximum allocation value ALLOC_MAX to the host device 110.

The host device 110 requiring a ZNS may transmit a ZNS allocation request ALLOC_ZNS including a start logical address to the block allocation circuit 215 of the ZNS management circuit 210.

When the required ZNS size is included in the ZNS allocation request ALLOC_ZNS, the block allocation circuit 215 may map a start physical address PBA to a start logical address LBA, access the bitmap table BTMT at a position corresponding to the start physical address, and select a plurality of free blocks corresponding to the required ZNS size, thereby constituting the ZNS. When the size of the ZNS to be allocated is not included in the ZNS allocation request, the block allocation circuit 215 may allocate, to the ZNS, a preset number of blocks corresponding to a default value, e.g., a single block corresponding to the default ZNS unit. However, the present embodiment is not limited thereto.

When selecting the blocks to allocate the ZNS, the block allocation circuit 215 may select the blocks constituting the ZNS, such that the blocks can be accessed in parallel through the die interleaving or channel interleaving method.

The block allocation circuit 215 may transmit block information BLK_No allocated to the ZNS to the block state setting circuit 211 and the ZNS information management circuit 217.

The block state setting circuit 211 may update the bitmap table BTMT on the basis of the allocated block information BLK_No.

The ZNS information management circuit 217 may generate and manage, as a block list for each ZNS, the start logical address for each ZNS, the physical addresses of blocks included in each ZNS, information on whether data are stored in the respective blocks, and the resultant size of a remaining space. As the block information BLK_No allocated to the ZNS is transmitted from the block allocation circuit 215, the ZNS information management circuit 217 may generate the block list for each ZNS.

Figure 5:
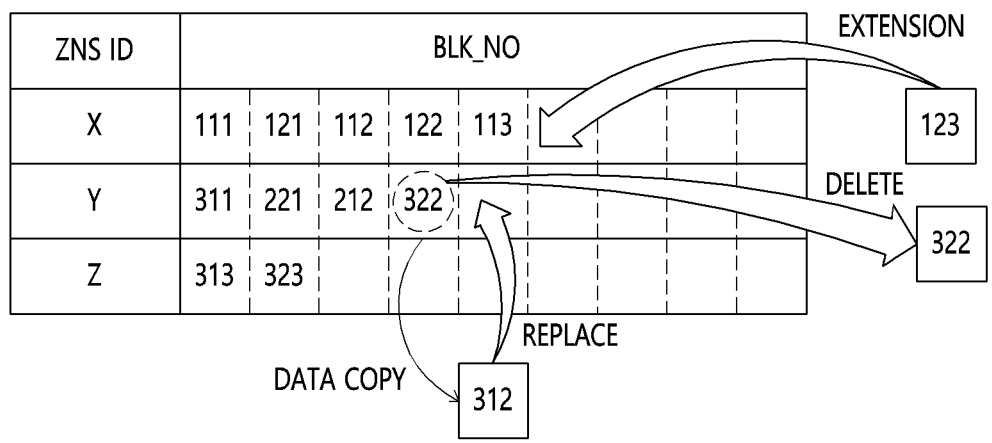
FIG. 5 is a diagram for describing a block pool for each ZNS in accordance with an embodiment of the present disclosure.
Figure 6:
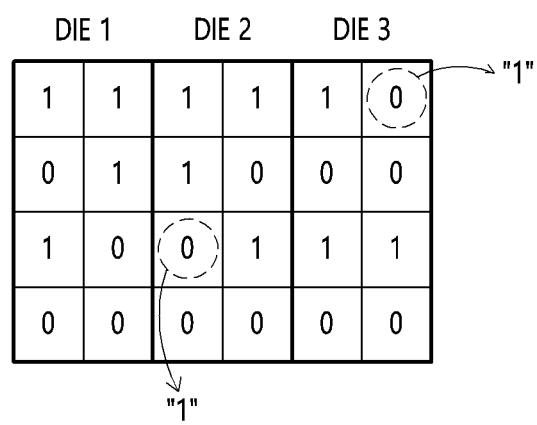
FIG. 6 illustrates a bitmap table in accordance with an embodiment of the present disclosure.

FIG. 5 is a diagram for describing a block pool for each ZNS in accordance with an embodiment of the present disclosure, and FIG. 6 illustrates a bitmap table in accordance with an embodiment of the present disclosure.

In FIG. 5, three ZNSs with IDs of X, Y and Z are generated according to the ZNS allocation request of the host device 110. The ID of each ZNS may be the start logical address, but the present embodiment is not limited thereto.

Referring to FIGS. 4 to 6, physical blocks {111, 121, 112, 122, 113} are allocated to a ZNS X. Thus, the bitmaps of the positions corresponding to the physical blocks may be set to '1', for example, in the bitmap table BTMT illustrated in FIG. 6.

Furthermore, physical blocks {311, 221, 212, 322} are allocated to a ZNS Y. Such a condition is reflected into the bitmap table BTMT of FIG. 6. The same condition is applied to a ZNS Z.

In response to a write request WT of the host device 110, the ZNS information management circuit 217 may check whether the size of data corresponding to the write request is larger than the size of the remaining (free) space of the ZNS in which the data is to be stored, by referring to the block list for each ZNS.

When the remaining space is insufficient, the ZNS information management circuit 217 may request ZNS extension (ZNS_EXT) by transmitting the number of blocks to be added to the block allocation circuit 215.

As described above, the block allocation circuit 215 may add a block to the corresponding ZNS by referring to the bitmap table BTMT. In an embodiment, the block allocation circuit 215 may allocate a necessary number of blocks in a round-robin manner by rotating the dies from the next die to the die to which the last allocated block belongs. Block information EXTBLK_No on the block added after the block extension is provided to the block state setting circuit 211 and the ZNS information management circuit 217 to update the bitmap table BTMT and the block list for each ZNS.

Referring to FIGS. 4 to 6, the case in which the size of write data for the ZNS X is larger than the remaining space of the ZNS X will be described as an example.

The block allocation circuit 215 may extend the ZNS X by additionally allocating a physical block {123} to the ZNS X. Furthermore, the ZNS extension may be reflected into the block list for each ZNS and the bitmap table BTMT.

When the ZNS extension is completed, the ZNS information management circuit 217 may transmit a write request WT including a physical address constituting the ZNS to the write control circuit 220.

The write control circuit 220 may transmit a program command PGM to the storage 140 in response to the write request WT.

When data are stored in the blocks constituting the ZNS, the ZNS information management circuit 217 may update information on whether the data are stored in the respective blocks and the resultant size of the remaining space.

The event detection circuit 219 may request (ALLOC_TGBLK) the block allocation circuit 215 to allocate a target block TBBLK, which is to be replaced in response to a replace command REPLACE including source block information SCBLK_No indicating a source block to be replaced.

As described above, the block allocation circuit 215 may select the target block among the free blocks by referring to the bitmap table BTMT, and transmit target block information TGBLK_No to the event detection circuit 219. The target block information TGBLK_No is provided to the block state setting circuit 211 and the ZNS information management circuit 217 to update the bitmap table BTMT and the block list for each ZNS.

The event detection circuit 219 may transmit the block replace command REPLACE, including the source block information SCBLK_No and the target block information TGBLK_No, to the block replacement circuit 230.

Referring to FIGS. 4 to 6, the case in which a block {322} included in the ZNS Y is a source block to be replaced will be described.

The block allocation circuit 215 may select, as the target block, a block {312} which is one of free blocks included in the same die DIE2 as the source block. Valid data of the block {322} is copied into the block {312}, and block information {322} is replaced with block information {312} in the block list of the ZNS Y.

Furthermore, such a condition may be reflected into the bitmap table BTMT. When block replacement was performed because the source block {322} is a bad block, the bit information of the source block {322} is not changed in the bitmap table BTMT, such that the bad block {322} is prevented from being selected as a free block.

The block replacement circuit 230 may migrate (copy) valid data of the source block SCBLK to the target block TGBLK in response to the block replace command REPLACE.

When the source block SCBLK has become a bad block, the source block information SCBLK_No is added to a bad block list of the meta information management circuit 213, such that the source block SCBLK is excluded from block allocation during at least a ZNS-related operation.

Figure 7:
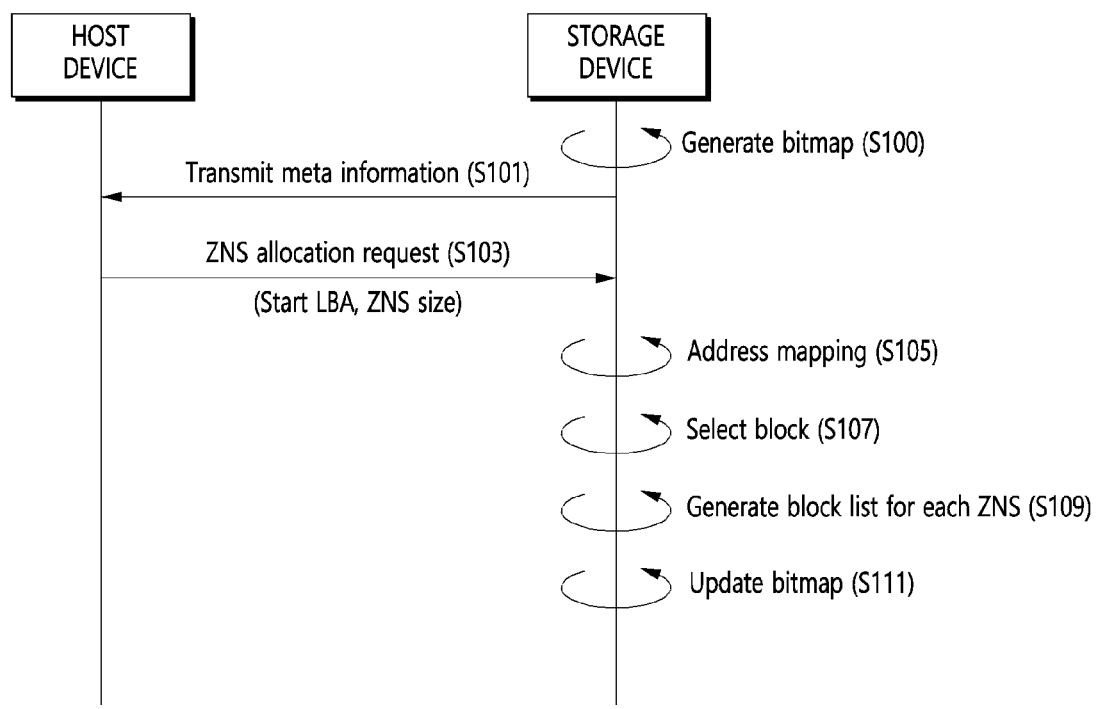
FIG. 7 is a flowchart for describing an operating method of a storage device in accordance with an embodiment of the present disclosure.

FIG. 7 is a flowchart for describing an operating method of a storage device in accordance with an embodiment of the present disclosure, illustrating a ZNS generation method.

When the data processing system 100 or the storage device 120 is activated or initialized, the controller 130 of the storage device 120 may generate and store a bitmap table BTMT indicating the states of at least the memory blocks for user data within the storage 140 by sequentially scanning the blocks constituting the storage 140, in operation S100.

The controller 130 may distinguish between an allocable block and an unallocable block in the bitmap table BTMT by setting data having a first logic level (e.g., 0) to a free block and setting data having a second logic level (e.g., 1) to a bad block or a block which is being used or occupied by data. Thus, the total number of free blocks for user data may be acquired.

The ZNS management circuit 210 may transmit, to the host device 110, meta information including the total number of free blocks for user data, acquired in operation S100, and the default ZNS unit supported by the storage device 120, i.e., the size of a single block, in operation S101.

As the host device 110 transmits a ZNS allocation request including a start logical address to the controller 130 in operation S103, the controller 130 may map a start physical address PBA to the start logical address LBA in operation S105.

When a required ZNS size is included in a ZNS allocation request ALLOC_ZNS of the host device 110, the controller 130 may access the bitmap table BTMT at a position corresponding to the start physical address, and select a plurality of free blocks corresponding to the required ZNS size, thereby constituting the ZNS, in operation S107.

When the size of the ZNS to be allocated is not included in the ZNS allocation request of the host device 110, the controller 130 may select a preset number of blocks as a default value, e.g., a single block which is the default ZNS unit, and configure the ZNS in operation S107. However, the present embodiment is not limited thereto.

In an embodiment, when selecting the blocks to allocate the ZNS, the controller 130 may select the blocks constituting the ZNS, such that the blocks can be accessed in parallel through the die interleaving or channel interleaving method.

When a ZNS is generated, the controller 130 may generate a block list for each ZNS, including the start logical address of the corresponding ZNS, the physical addresses of blocks included the ZNS, information on whether data are stored in the respective blocks, and the resultant size of the remaining space, in operation S109.

Furthermore, the controller 130 may update the bitmap table BTMT on the basis of the physical address of an allocated block, in operation S111.

Figure 8:
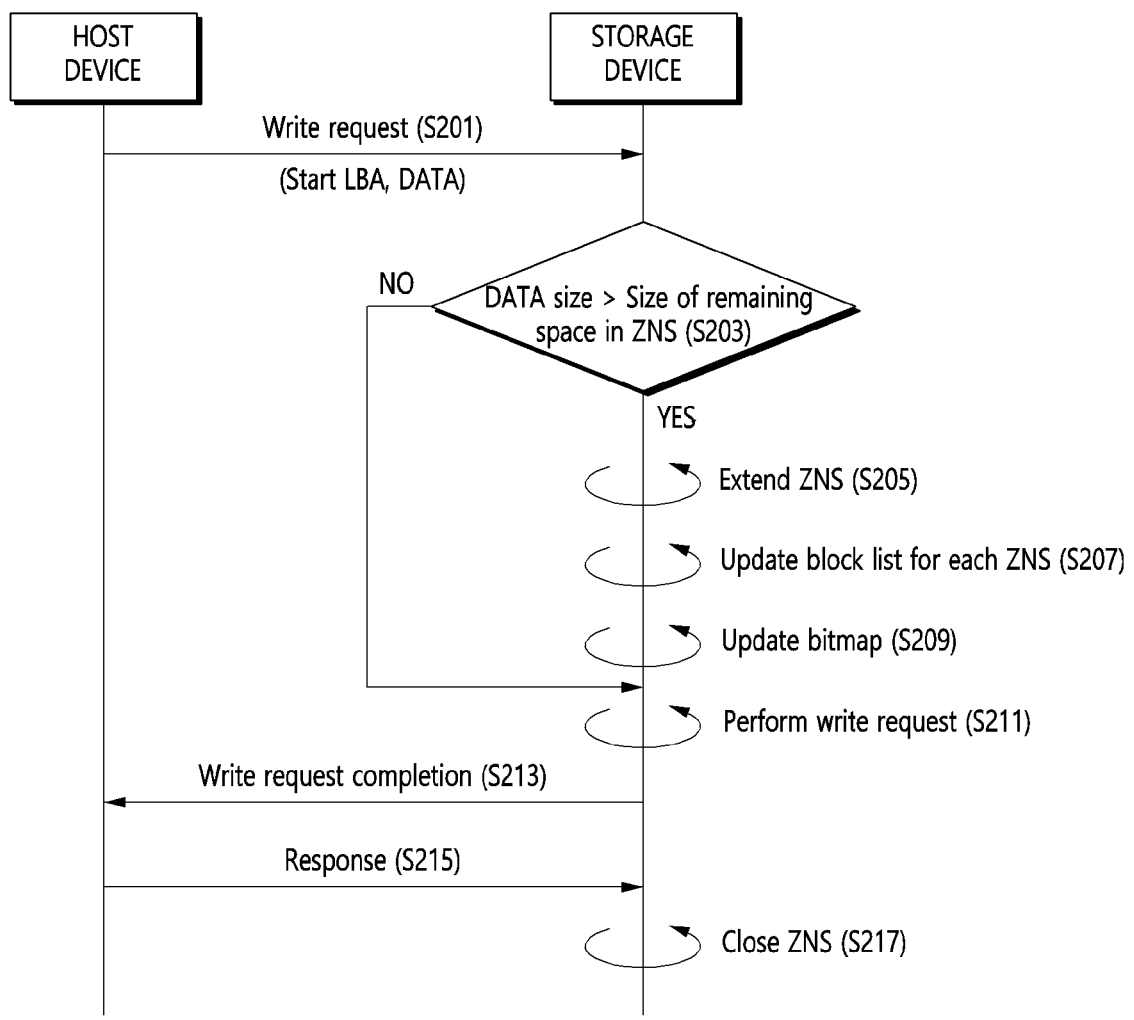
FIG. 8 is a flowchart for describing an operating method of a storage device in accordance with an embodiment of the present disclosure.

FIG. 8 is a flowchart for describing an operating method of a storage device in accordance with an embodiment of the present disclosure, illustrating a ZNS extension method.

The host device 110 may transmit a write request WT to the storage device 120, the write request WT including write data and the start logical address LBA at which data is to be written, in operation S201.

The controller 130 of the storage device 120 may check whether the size of data corresponding to the write request is larger than the size of the remaining (free) space of a ZNS in which the data is to be stored, by referring to the block list for each ZNS which includes the start logical address LBA, in operation S203.

When the remaining space is insufficient (Y in operation S203), the controller 130 may extend the capacity of the corresponding ZNS in operation S205.

In an embodiment, the controller 130 may add a block to the corresponding ZNS by referring to the bitmap table BTMT. At this time, the controller 130 may allocate a necessary number of blocks in a round-robin manner by rotating the dies from the next die to the die to which the last allocated block belongs.

According to information on the block added after the block extension, the block list for each ZNS and the bitmap table BTMT are updated in operations S207 and S209, respectively.

Since the space to store data has been secured, the write request of the host device 110 may be normally performed in operation S211, and the controller 130 may report the completion of the write request to the host device 110 in operation S213. Thus, as the host device 110 responds to the report in operation S215, the controller 130 may switch the corresponding ZNS to the closed state in operation S217.

When the remaining space is sufficient (N in operation S203), the controller 130 may perform operation S211 of performing the write request.

Figure 9:
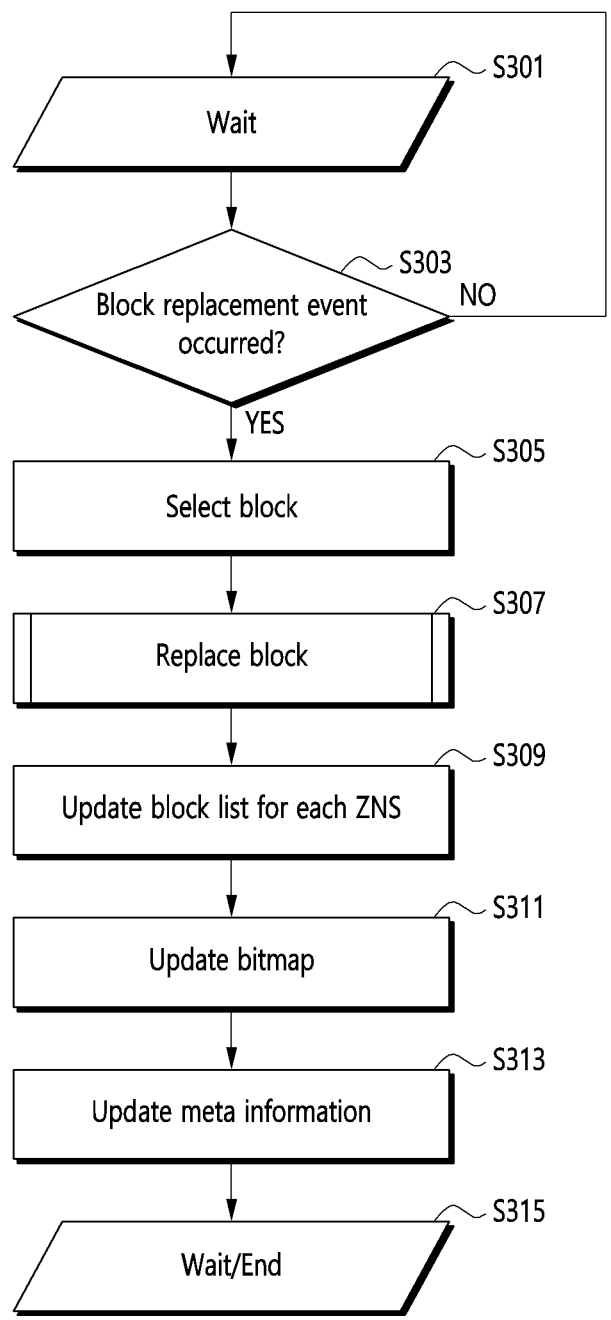
FIG. 9 is a flowchart for describing an operating method of a storage device in accordance with an embodiment of the present disclosure.

FIG. 9 is a flowchart for describing an operating method of a storage device in accordance with an embodiment of the present disclosure, illustrating a method for replacing a block within a ZNS.

The controller 130 may monitor whether a block replacement event occurs, while waiting in operation S301, for example, in operation S303. The block replacement event may occur when a block constituting a ZNS deteriorates or becomes a bad block.

When no block replacement event occurs (N in operation S303), the controller 130 continues monitoring.

When the block replacement event occurs (Y in operation S303), the controller 130 may select a target block among free blocks by referring to the bitmap table, in response to a replace command including information on a source block to be replaced, in operation S305.

In an embodiment, if possible, the target block may be selected among free blocks included in the same die as the source block.

Thus, a block replacement process in which data of the source block is copied to the target block may be performed in operation S307.

Then, the controller 130 may update the block list for each ZNS and the bitmap table on the basis of the source block information and the target block information, in operations S309 and S311, respectively.

When the block replacement is performed because the source block is a bad block, in the case that the bitmap table is updated in operation S311, the bit information of the source block in the bitmap table is not changed to prevent the bad block from being selected as a free block.

The controller 130 may add the source block information to the bad block list in operation S313, and wait or end the process in operation S315.

As such, the controller 130 may easily and rapidly allocate a ZNS, adaptively to a variable data size of the host device 110, and change the size of a generated ZNS. Furthermore, when data needs to be refreshed or read-reclaimed, valid data may be migrated by the minimum unit of the ZNS, which makes it possible to efficiently use the storage 140.

Figure 10:
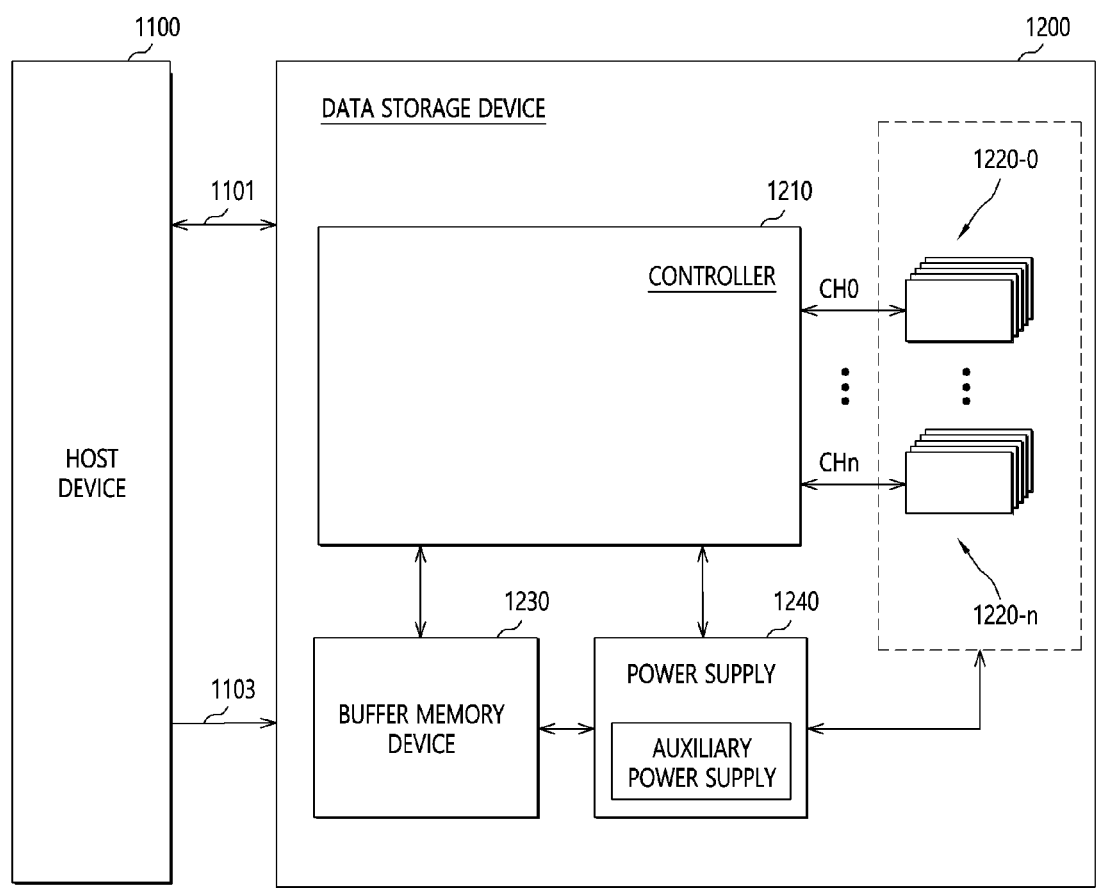
FIG. 10 is a diagram illustrating a data storage system in accordance with an embodiment of the present disclosure.

FIG. 10 is a diagram illustrating a data storage system 1000, in accordance with an embodiment of the present disclosure.

Referring to FIG. 10, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may be configured as the controller 130 shown in FIGS. 1 to 3.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least io one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n, and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 11:
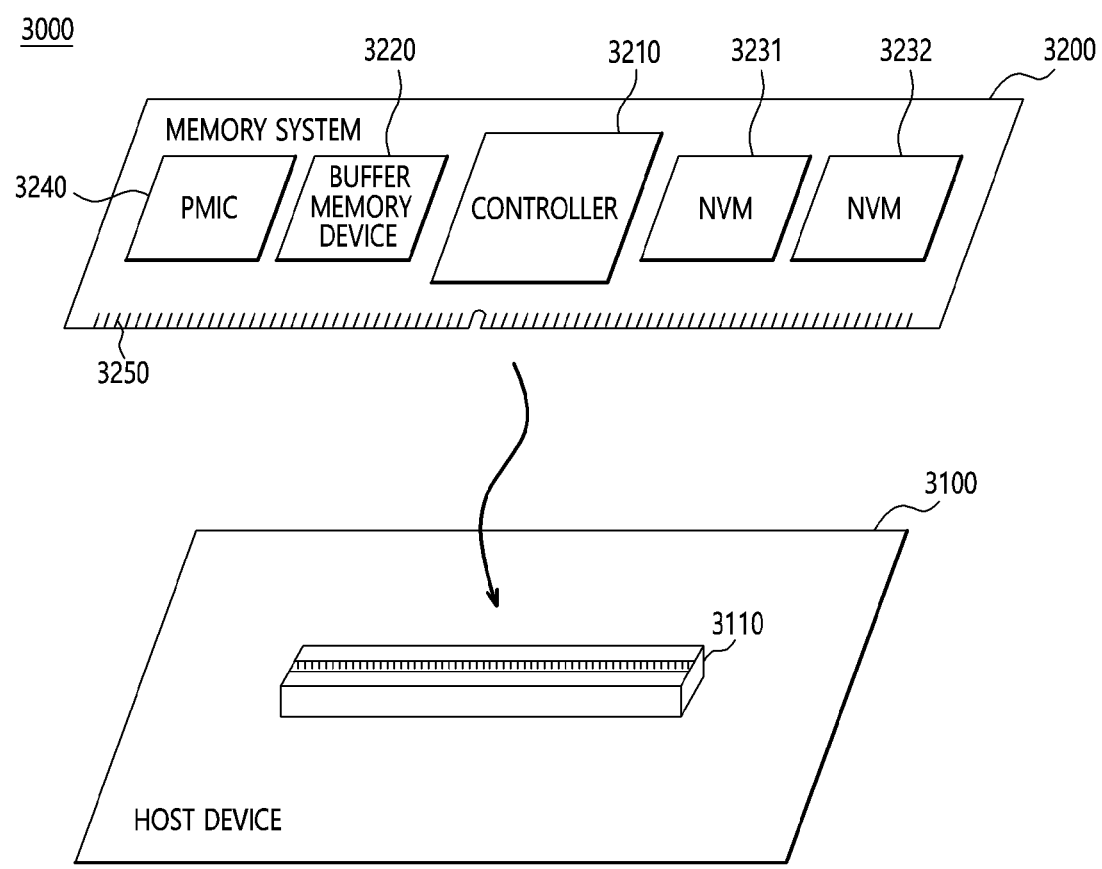
FIG. 11 and FIG. 12 are diagrams illustrating a data processing system in accordance with an embodiment of the present disclosure.

FIG. 11 is a diagram illustrating a data processing system 3000, in accordance with an embodiment of the present disclosure. Referring to FIG. 11, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 130 shown in FIGS. 1 to 3.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be io transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the is connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 12:
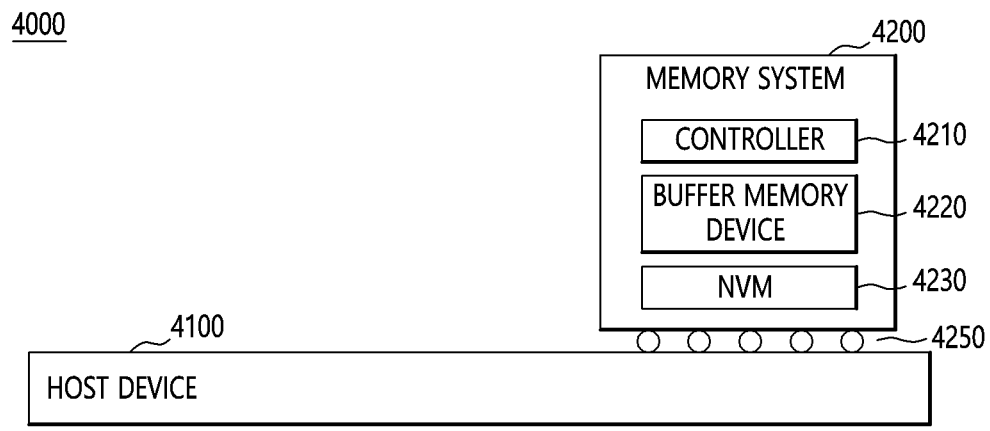

FIG. 12 is a diagram illustrating a data processing system 4000 in accordance with an embodiment of the present disclosure. Referring to FIG. 12, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 130 shown in FIGS. 1 to 3.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 13:
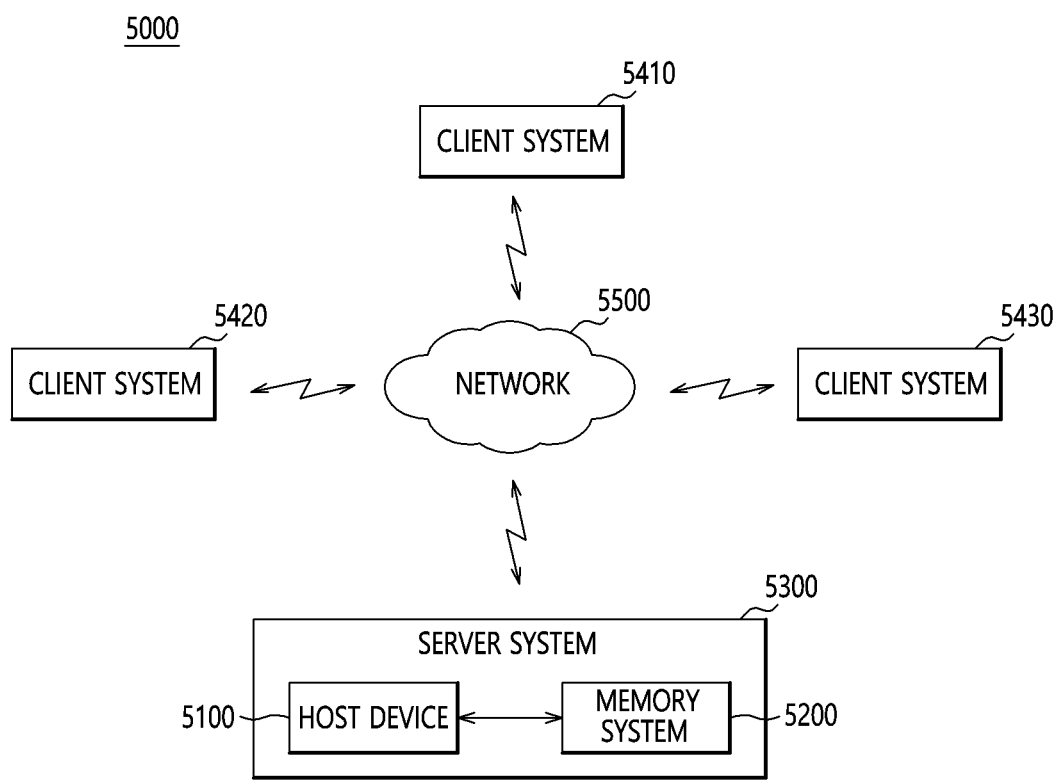
FIG. 13 is a diagram illustrating a network system including a data storage device in accordance with an embodiment of the present disclosure.

FIG. 13 is a diagram illustrating a network system 5000 including a data storage device, in accordance with an embodiment of the present disclosure. Referring to FIG. 13, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the storage device 120 shown in FIG. 1, the data storage device 1200 shown in FIG. 10, the memory system 3200 shown in FIG. 11, or the memory system 4200 shown in FIG. 12.

Figure 14:
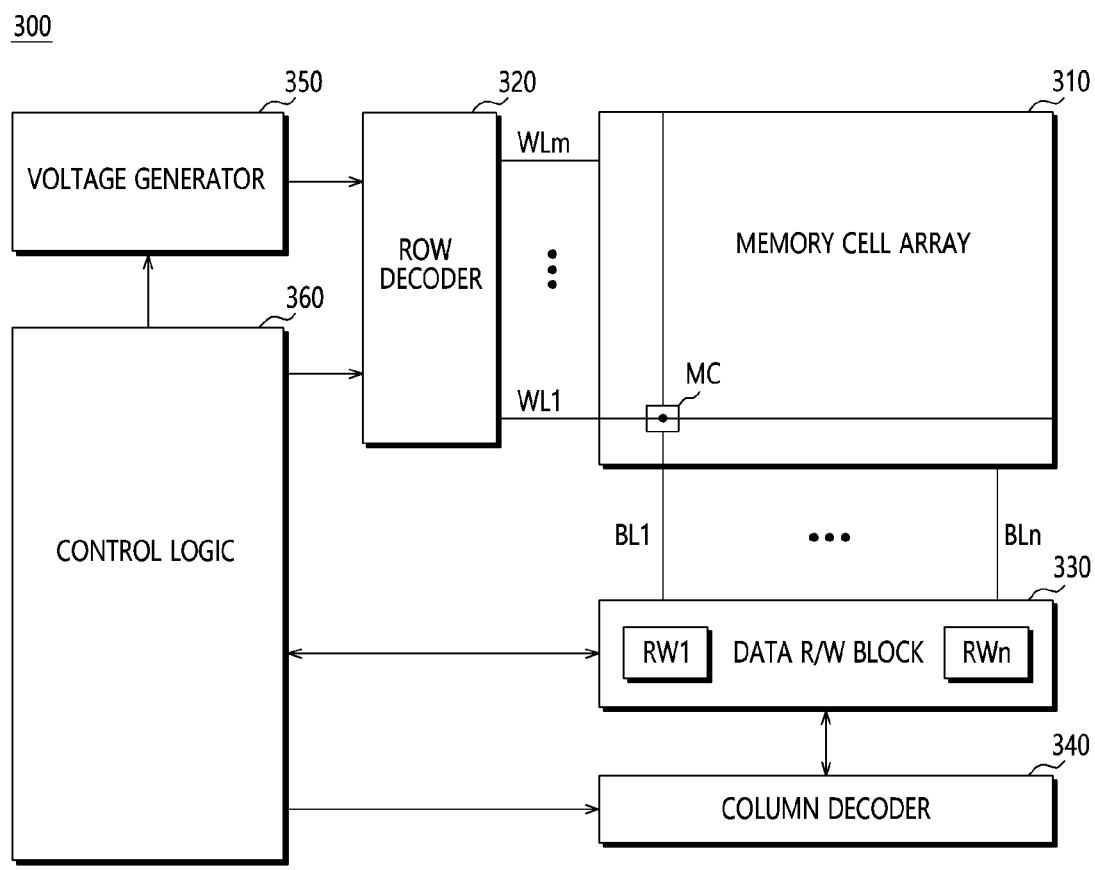
FIG. 14 is a block diagram illustrating a nonvolatile memory device included in a data storage device in accordance with an embodiment of the present disclosure.

FIG. 14 is a block diagram illustrating a nonvolatile memory device 300 included in a data storage device, such as the data storage device 10, in accordance with an embodiment of the present disclosure. Referring to FIG. 14, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure in a perpendicular direction to the flat surface of a semiconductor substrate. Moreover, the three-dimensional memory array means a structure including NAND strings which memory cells comprised in the NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array of memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only. Accordingly, the storage device and the operating method, which are described herein, should not be limited based on the described embodiments and the following claims. Furthermore, the embodiments may be combined to form additional embodiments.

What is claimed is:

1. A storage device comprising:
   a storage comprising a plurality of dies each having a plurality of memory blocks, and configured to provide a default ZNS (Zoned NameSpace) size to a host device; and
   a controller configured to generate a ZNS by selecting one or more memory blocks corresponding to a required ZNS size from the plurality of dies to allocate the selected memory blocks to the ZNS in response to a ZNS generation request signal which includes the required ZNS size and is provided from the host device,
   wherein the controller is further configured to allocate, when the host device transmits a write request including write data, a size of which is larger than a remaining capacity of the ZNS, another memory block to the ZNS based on of the size of the remaining capacity and the size of the write data corresponding to the write request to process the write request with the ZNS.

2. The storage device according to claim 1, wherein the controller is further configured to manage information on the memory blocks allocated to the ZNS as a block list for each ZNS.

3. The storage device according to claim 1, wherein the controller is further configured to manage, as a bitmap table, information on whether the plurality of memory blocks are each allocable to the ZNS.

4. The storage device according to claim 1, wherein the controller is further configured to:
   select, in response to a block replace command for at least one source memory block allocated to the ZNS, at least one target memory block which does not belong to the ZNS,
   allocate the selected target memory block to the ZNS, and
   migrate valid data of the source memory block to the target memory block.

5. The storage device according to claim 4, wherein the controller selects the target memory block within a die including the source memory block.

6. The storage device according to claim 1, wherein the default ZNS size corresponds to a minimum erase unit of the storage.

7. The storage device according to claim 1, wherein the required ZNS size is a number of memory blocks to be allocated to the ZNS.

8. A storage device comprising:
   a storage comprising a plurality of memory blocks; and
   a controller configured to:
   gather a plurality of memory blocks to generate a Zoned NameSpace (ZNS) having a size requested by a host device, and
   adjust the size of the generated ZNS on the basis of based on a size of write data provided by the host device
   wherein the controller is further configured to additionally allocate, when the host device transmits a write request including the write data, a size of which is larger than a remaining capacity of the ZNS, another memory block to the ZNS based on the size of the remaining capacity and the size of the write data corresponding to the write request to process the write request with the ZNS.

9. The storage device according to claim 8, wherein the controller is further configured to manage information on the memory blocks constituting the ZNS as a block list for each ZNS.

10. The storage device according to claim 8, wherein the controller is further configured to manage, as a bitmap table, information on whether the plurality of memory blocks are each allocable to the ZNS.

11. The storage device according to claim 8, wherein the controller is further configured to:
    select valid data stored in the ZNS on a memory block basis,
    migrate the selected data to a target memory block which does not belong to the ZNS, and
    allocate the target memory block to the ZNS.

12. An operating method of a storage device, comprising:
    transmitting, by a controller, a default Zoned NameSpace (ZNS) size to a host device, the controller serving to control a storage including a plurality of dies each having a plurality of memory blocks;
    receiving, by the controller, a ZNS generation request signal including a required ZNS size from the host device;
    generating, by the controller, a ZNS by selecting one or more memory blocks corresponding to the required ZNS size from the plurality of dies and allocating the selected memory blocks to the ZNS:,
    receiving, by the controller, a write request including write data, a size of which is larger than a remaining capacity of the ZNS, from the host device;
    additionally allocating, by the controller, another memory block to the ZNS based on the size of the remaining capacity and the size of the write data corresponding to the write request; and processing, by the controller, the write request with the ZNS.

13. The operating method according to claim 12, further comprising managing, by the controller, information on the memory blocks allocated to the ZNS as a block list for each ZNS.

14. The operating method according to claim 12, further comprising managing, by the controller, information on whether the plurality of memory blocks are each allocable to the ZNS, as a bitmap table.

15. The operating method according to claim 12, further comprising:
  selecting, by the controller, at least one target memory block which does not belong to the ZNS in response to a block replace command for at least one source memory block allocated to the ZNS;
  allocating the selected target memory block to the ZNS; and
  migrating valid data of the source memory block to the target memory block.

16. The operating method according to claim 15, wherein the target memory block is selected within a die including the source memory block.

17. The operating method according to claim 12, wherein the default ZNS size corresponds to a minimum erase unit of the storage.

18. The operating method according to claim 12, wherein the required ZNS size is a number of memory blocks to be allocated to the ZNS.

19. An operating method of a controller, the operating method comprising:
  allocating one or more empty storage mediums to a zoned namespace (ZNS), which is configured in units of storage mediums; and
  controlling a memory device to perform an operation on the ZNS, wherein:
  the empty storage mediums are allocated according to one of a die interleaving scheme and a channel interleaving scheme
  the operation includes an erase operation to be performed in the units of storage mediums, and
  wherein the allocating includes additionally allocating another at least one empty storage medium to the ZNS based on the size of a remaining capacity and a size of write data corresponding to a write request to process the write request with the ZNS, when a host device transmits the write request including the write data, the size of which is larger than the remaining capacity of the ZNS.

20. The operating method of claim 19, wherein the allocating includes replacing a storage medium, which is previously allocated to the ZNS, with the empty storage medium.

* * * * *